United States Patent [19]

Abe et al.

[11] Patent Number: 5,265,707

[45] Date of Patent: Nov. 30, 1993

[54] INTERRUPTING DEVICE IN A FRICTION TYPE ONE-WAY CLUTCH

[75] Inventors: Shunichiro Abe, Komaki; Hiroo Morishima, Nagoya, both of Japan

[73] Assignees: Mitsubishi Jukogyo Kabushiki Kaisha, Tokyo; Churyo Engineering Kabushiki Kaisha, Aichi, both of Japan

[21] Appl. No.: 980,925

[22] Filed: Nov. 24, 1992

[30] Foreign Application Priority Data

Nov. 27, 1991 [JP] Japan .................. 3-312252

[51] Int. Cl.⁵ .................................. F16D 41/08
[52] U.S. Cl. .................................. 192/47; 192/35; 192/45; 192/48.92; 192/84 T
[58] Field of Search .............. 192/45, 47, 84 R, 84 T, 192/35, 48.2, 48.92

[56] References Cited

U.S. PATENT DOCUMENTS

| | | | |
|---|---|---|---|
| 2,919,000 | 12/1959 | Claytor | 192/84 T |
| 3,164,234 | 1/1965 | Tamarin | 192/47 X |
| 3,907,083 | 9/1975 | Nieder | 192/47 X |
| 4,030,581 | 6/1977 | Giometti | 192/84 T X |
| 4,159,048 | 6/1979 | Baxter et al. | 192/47 X |
| 4,284,183 | 8/1981 | Brisabois et al. | 192/47 X |
| 4,531,620 | 7/1985 | Stone | 192/47 X |
| 5,158,164 | 10/1992 | Seaton | 192/47 |

FOREIGN PATENT DOCUMENTS 2521921 8/1983 France .
2563299 10/1985 France .

*Primary Examiner*—Leslie A. Braun
*Assistant Examiner*—Andrea Pitts
*Attorney, Agent, or Firm*—Wenderoth, Lind & Ponack

[57] ABSTRACT

A friction type one-way clutch includes friction elements held by a retainer between an input side member and an output side member. The friction elements are released from frictional engagement with the input side and output side members to interrupt power transmission from the input side member to the output side member by rotating the retainer. For rotating the retainer, a rotor is formed on the retainer, and a stator having coils for generating a rotational magnetic field is disposed around the rotor. An electric current is fed to the coils of the stator to generate a rotational magnetic field, and the rotation of the rotor by this rotational magnetic field rotates the retainer.

3 Claims, 8 Drawing Sheets

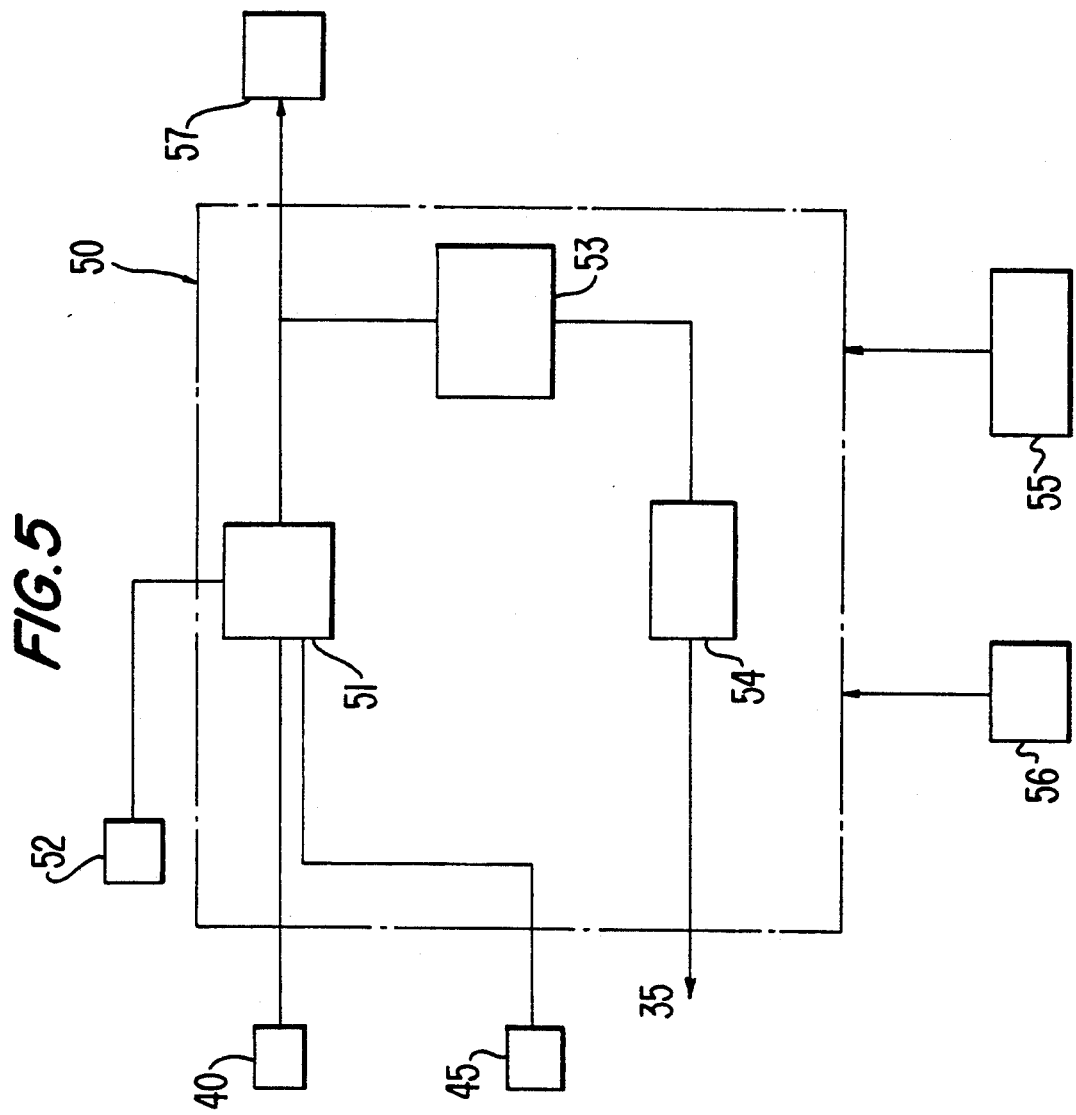

INTERRUPTING DEVICE IN A FRICTION TYPE ONE-WAY CLUTCH

BACKGROUND OF THE INVENTION

1. Field of the Invention

The present invention relates to a device for interrupting power transmission from an input side to an output side in a friction type one-way clutch.

2. Description of the Prior Art

In a helicopter, for instance, a main transmission system for transmitting power of an engine to a main rotor (a lift rotor) is provided with a clutch, a reduction gear and the like, and in some cases a friction type one-way clutch is employed as the aforementioned clutch.

A friction type one-way clutch in the prior art will be described with reference to FIGS. 7-9.

In these figures, reference numeral 100 designates a clutch housing, and within this clutch housing 100 is rotatably supported an input shaft 110 via bearings 101 and 102. It is to be noted that the bearing 102 is disposed inside an output shaft 114 which will be described later.

The input shaft 110 is cylindrical and an input gear 112 is formed on the outer surface of its one end. This input gear 112 is connected to an engine (not shown) to receive rotation from the engine.

Outside the above-mentioned input shaft 110 is rotatably supported an output shaft 114 as spaced from the input shaft 110. The output shaft 114 is also cylindrical and is supported rotatably with respect to the housing 100 via bearings 103 and 104, but it can rotate independently of the above-mentioned input shaft 110. An output gear 116 is formed on the outer surface of one end of the output shaft 114. This output gear 116 is connected to a drive system for rotating, for instance, a main rotor of a helicopter.

Between the above-mentioned input shaft 110 and output shaft 114 is provided a friction type one-way clutch 120. The structure of the one-way clutch 120 is shown also in FIGS. 8 and 9, in which a cam section 122 and a cam ring section 124 are formed at the outer surface of the input shaft 110 and the inner surface of the output shaft 114. Between these cam section 122 and cam ring section 124 is provided a gap whose width varies in the circumferential direction, and a plurality of rollers 126 and a cylindrical retainer 128 are provided in this gap along the circumferential direction to form the one-way clutch. As shown in FIG. 8, the respective rollers 126 are rotatably accommodated within holding holes formed in the retainer 128.

As shown in FIG. 9(a), if the input shaft 110 rotates in the direction of an arrow, the cam section 122 and the cam ring section 124 would relatively displace in the circumferential direction. Hence, the rollers 126 would frictionally engage the cam section 122 and the cam ring section 124 in a narrower portion of the gap and would become frictionally constrained between these input shaft 110 and output shaft 114. Accordingly, rotation of the rollers 126 is prevented, so that rotation of the input shaft 110 is transmitted to the output shaft 114 via the rollers 126 and the output shaft 114 is rotated in the direction of the arrow integrally with the input shaft 110.

However, if the retainer 128 is moved in the circumferential direction as shown in FIG. 9(b), the retainer 128 would shift the rollers 126 to a wider portion of the gap between the cam section 122 and the cam ring section 124 consequently the rollers 126 are released from constrainment between the cam section 122 and the cam ring section 124, so that the coupling between the input shaft 110 and the output shaft 114 is interrupted and rotation of the input shaft 110 cannot be transmitted to the output shaft 114.

Under a normal condition, a spring 134 is equipped between a spring receiving portion 130 formed on the input shaft 110 and a spring receiving portion 132 formed on the retainer 128. Hence the retainer 128 is pushed in the circumferential direction by this spring 134, and the rollers 126 are pushed towards the narrower portion of the gap between the cam section 122 and the cam ring section 124. Consequently, the clutch is held in an ON state.

As described previously, however, if the end portion of the retainer 128 is pushed in the circumferential direction against the resilient force of the spring 134, then the retainer 128 would rotate, and since the rollers 126 would shift in the circumferential direction, the coupling is released and the clutch is turned to an OFF state.

Means for actuating the retainer 128 in the circumferential direction in the prior art will be described in the following.

That is, at one end of the retainer 128 is formed an extension as shown in FIGS. 7 and 8, and in this extension is formed a cam hole 136 having a triangular window shape as will be apparent from FIG. 8. This cam hole 136 has a cam surface inclined with respect to the circumferential direction and the axial direction. Into the above-mentioned cam hole 136 is inserted a cam bar 138.

The cam bar 138 is engaged with a transmission sleeve 140 via splines, and it is fixedly secured to this transmission sleeve 140 by means of a nut 141.

The transmission sleeve 140 is disposed inside the input shaft 110 and is engaged with the input shaft 110 via splines, and accordingly it is freely movable in the axial direction.

Within the transmission sleeve 140 is slidably inserted a buffer rod 142, and between this buffer rod 142 and the above-mentioned transmission sleeve 140 is provided a coil spring 144.

The other end of the buffer rod 142 is introduced to the inside of an intermediate sleeve 146, which is also disposed inside the input shaft 110 and is made movable in the axial direction by being engaged with the input shaft 110 via splines. The other end of the above-mentioned buffer rod 142 is adapted to butt against one end surface of the intermediate sleeve 146. At an end portion of this buffer rod 142 is fixed a spring receiver 45, and a coil spring 147 is disposed between this spring receiver 145 and the intermediate sleeve 146.

One end of the intermediate sleeve 146 is connected to an actuator shaft 151 via a bearing 148. In other words, although the intermediate sleeve 146 and the actuator shaft 151 would move integrally in the axial direction, relative rotational movement therebetween is allowed by the bearing 148.

The actuator shaft 151 is connected to an electrically-operated actuator, that is, a linear actuator 150. The linear actuator 150 is provided with a motor section, speed reduction gears for slowing down the rotation of the motor section, a screw jack mechanism for transforming the rotational motion slowed down by the reduction gears into linear motion, and the like, although not shown, and it is fixed to the other end of the clutch housing 100. Accordingly, if an electric signal is applied to the linear actuator 150, the actuator shaft 151 would be moved in the axial direction.

In the clutch having the above-described structure if the actuator shaft 151 is moved in the rightward direction as viewed in FIG. 7 by the linear actuator 150, the intermediate sleeve 146 is also moved in the axial direction in a similar manner. The movement in the axial direction of the intermediate sleeve 146 is transmitted to the buffer rod 142, and the movement of this buffer rod 142 is transmitted to the transmission sleeve 140 via the coil spring 144. That is, the transmission sleeve 140 is moved rightwards as viewed in FIG. 7. Then the cam bar 138 fixed to the transmission sleeve 140 also moves likewise in the rightward direction.

Since the cam bar 138 extends into the triangular cam hole 136 formed in the extension of the retainer 128 as will be apparent from FIG. 8, the above-mentioned movement of the cam bar 138 in the axial direction causes the retainer 128 to move in the circumferential direction, that is, to rotate.

More particularly, by the above-mentioned operation of the linear actuator 150 the retainer 128 is actuated in the circumferential direction. Hence as described previously, the retainer 128 shifts the rollers 126 to a wider portion of the gap between the camsection 122 and the cam ring section 124, and consequently, the rollers 126 are released. Therefore, power transmission between the input shaft 110 and the output shaft 114 is interrupted.

It is to be noted that the buffer rod 142 and the coil springs 144 and 147 are provided for the purpose of absorbing impacts of reciprocating motions caused by operation of the linear actuator 150.

In the clutch in the prior art as described above, a motor section, speed reduction gears and a screw jack mechanism or linear actuator 150 is used as a clutch interrupting device, and the buffer rod 142 and the coil springs 144 and 147 for absorbing impacts of reciprocating portions as well as the intermediate sleeve 146 and the transmission sleeve 140 constitute a large number of component parts. The structure is complicated, the route along which power is transmitted in the clutch is complicated, and a lot of labor is necessary for assembly.

Also, because the clutch interrupting device composed of a large number of component parts as described above must be accommodated within the hollow input shaft 110, the component parts must be small and so their mechanical strengths are not great. Also, vibrations of the input shaft would propagate to these members. Hence wear and damage caused by high-speed motion and high-frequency vibration are liable to occur, and so the reliability of the device is poor.

Furthermore, because the bearing 148 is used for transmitting torque generated in the stationary linear actuator 150 to the rotating input shaft 110, the wear-resisting property of this bearing 148 is of great concern, and precision in the centering of the bearing 148 is required.

In addition, in a power transmission system for interrupting a clutch, as a rule, it is necessary that the linear actuator 150 be disposed coaxially with the rod 142. Therefore, the layout of the system is restrictive. For instance, if another driving device or an auxiliary machine is connected to the other end of the clutch housing 100, the illustrated structure cannot be employed, or, in the event that the illustrated structure is employed, another driving device or an auxiliary machine cannot be disposed at the other end of the clutch housing 100.

SUMMARY OF THE INVENTION

The present invention has been developed in view of the above-described drawbacks of the prior art, and objects of the present invention are to provide an interrupting device in a friction type one-way clutch which has a simple structure and a comparatively small number of component parts, which requires a relatively small amount of labor for assembly, in which the assembly of component parts is easy because the component parts are not disposed within an input shaft, in which problems caused by vibration and friction are eliminated, and which has a layout that is not overly restrictive.

According to the present invention in order to achieve the above-mentioned objects, there is provided in a friction type one-way clutch, wherein an input side member and an output side member are disposed coaxially, cam surfaces define a gap therebetween of a width that varies along the circumferential direction, friction elements such as, for instance, rollers or needle bearing elements urged into contact with the cam surfaces and held by a retainer are provided between the input side member and output side member, rotation of the above-mentioned input side member is transmitted to the output side member by these friction elements frictionally engaging with the cam surfaces, and by rotating the above-mentioned retainer, the friction elements can be released from frictional engagement with the cam surfaces so as to interrupt power transmission from the input side member to the output side member, an interrupting device which comprises a rotor, and a stator having coils for generating a rotational magnetic field is disposed around the circumference of the rotor, whereby a rotational magnetic field is generated by feeding an electric current to the coils of the above-mentioned stator, and the above-described rotor is rotated by means of this rotational magnetic field so as to rotate the retainer.

According to the present invention, owing to the aforementioned structural features, if a rotational magnetic field is generated by feeding an electric current to the rotational magnetic field generating coils of the stator, then the rotor is rotated by this rotational magnetic field. Because the retainer is rotated by this rotation of the retainer, the friction elements can be released from frictional engagement with the cam surfaces, thereby interrupting power transmission from the input side to the output side.

As described above, according to the present invention, since the interrupting mechanism of a clutch is composed of a rotor and a stator, the structure is simple, the number of component parts is small, the assembly of the clutch is simple, and the installation space required is also small. Moreover, since this structure is of a non-contact type, vibrations and impacts would not be transmitted between the component parts, friction would not occur between the respective members, and the device has a long life. In addition, owing to the fact that the above-described interrupting mechanism is disposed outside of the input side member, the mechanism is not restricted by the size of the input side member. Moreover, because it is unnecessary to dispose a special component part, such as an actuator or the like, at the axial end portion of the housing, an axial end portion of the housing can be utilized.

The above-mentioned and other objects, features and advantages of the present invention will become more apparent by referring to the following description of one preferred embodiment of the present invention made in conjunction with the accompanying drawings.

BRIEF DESCRIPTION OF THE DRAWINGS

In the accompanying drawings:

FIG. 5 is a block diagram of a control unit in the same clutch;

DETAILED DESCRIPTION OF THE PREFERRED EMBODIMENT

Figure 1:
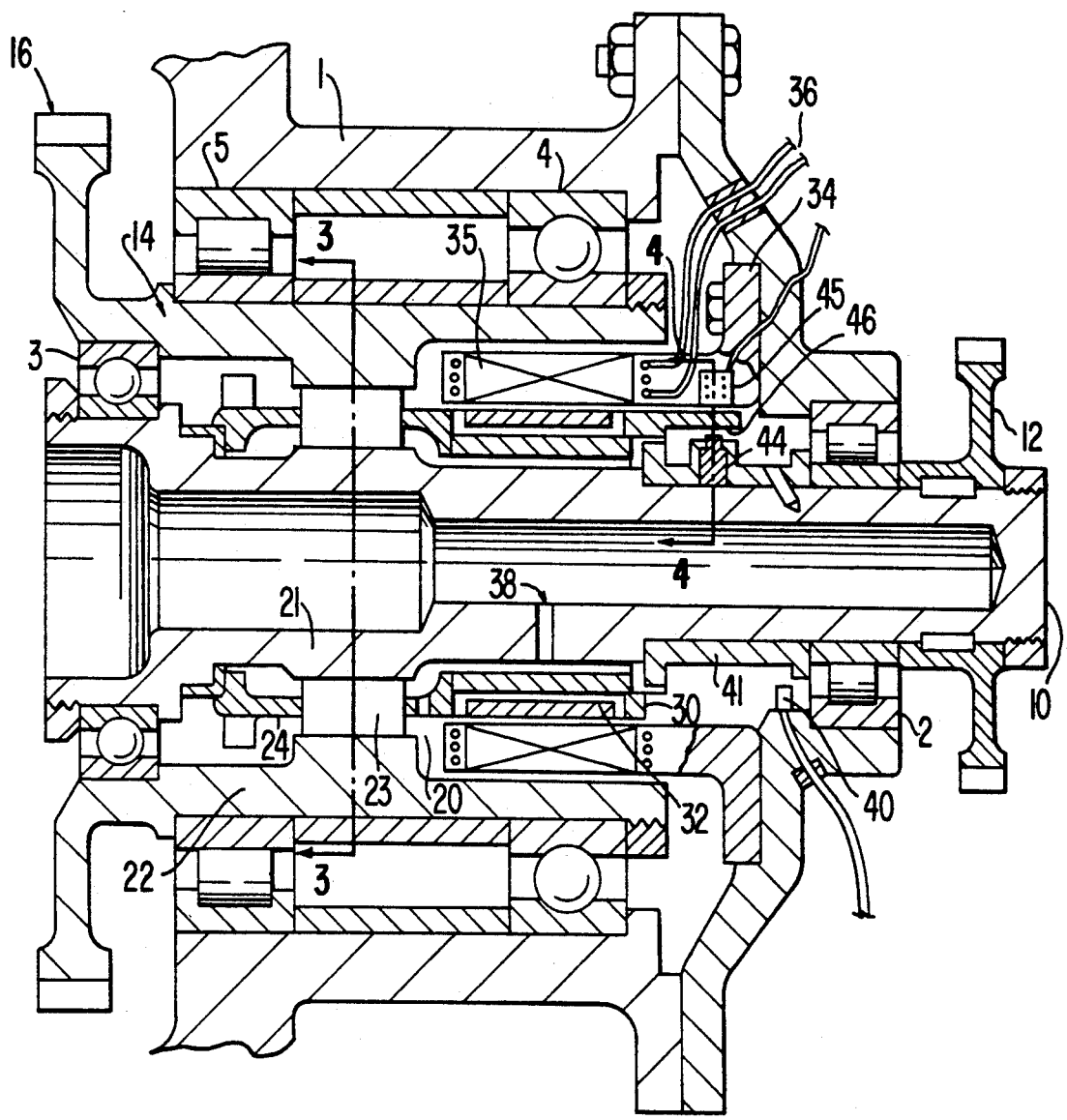
FIG. 1 is a cross-sectional view of a friction type one-way clutch according to one preferred embodiment of the present invention.

In the following, the present invention will be described in greater detail with regard to one preferred embodiment of the invention with reference to FIGS. 1 to 6.

The illustrated embodiment is a friction type one-way clutch applied to a main transmission system in a helicopter shown in FIG. 6, which will be described later.

FIGS. 1 to 4 illustrate the structure and operation of the friction type one-way clutch. In these figures, reference numeral 1 designates a clutch housing, and within this housing 1 is rotatably supported an input shaft 10 via bearings 2 and 3. It is to be noted that one bearing 3 is disposed inside an output shaft 14. The above-mentioned input shaft 10 is cylindrical and on the outer surface of one end thereof is mounted an input gear 12 so as to rotate integrally therewith. This input gear 12 is connected to an engine (not shown), and receives a torque from the engine.

On the outside of the above-mentioned input shaft 10 is rotatably supported an output shaft 14 as spaced from the input shaft 10. The output shaft 14 is also cylindrical, and it is rotatably supported via bearings 4 and 5 in a coaxial manner with respect to the housing 1. Accordingly, the input shaft 10 and the output shaft 14 can rotate independently of each other. On the outer surface of one end of the output gear 14 is formed an output gear 16. This output gear 16 is connected to a drive system for rotating a main rotor which will be described later.

Between the above-mentioned input shaft 10 and output shaft 14 is provided a friction type one-way clutch 20.

Figure 2:
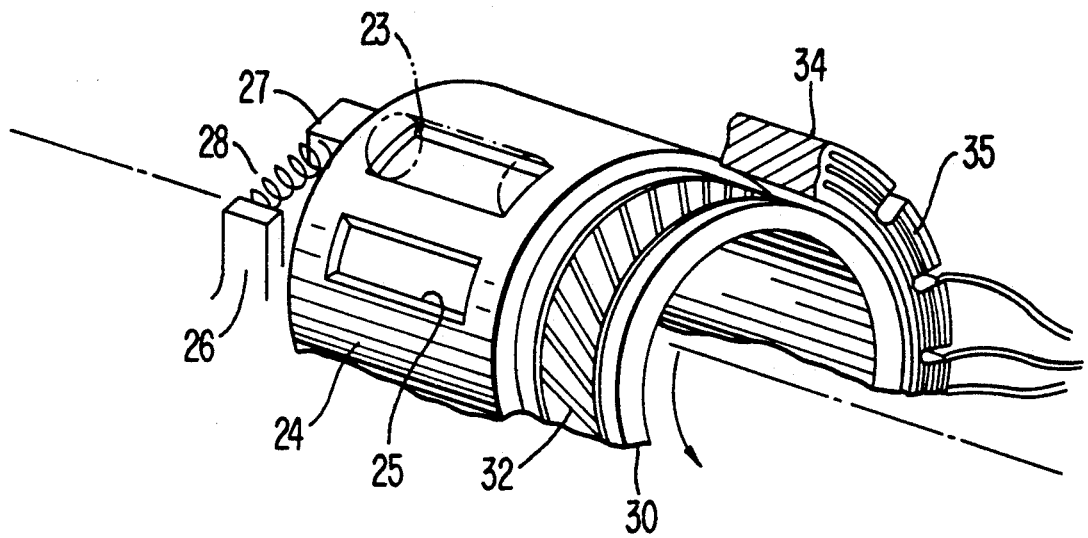
FIG. 2 is a perspective view of an interrupting device in the one-way clutch shown in FIG. 1.
Figure 8:
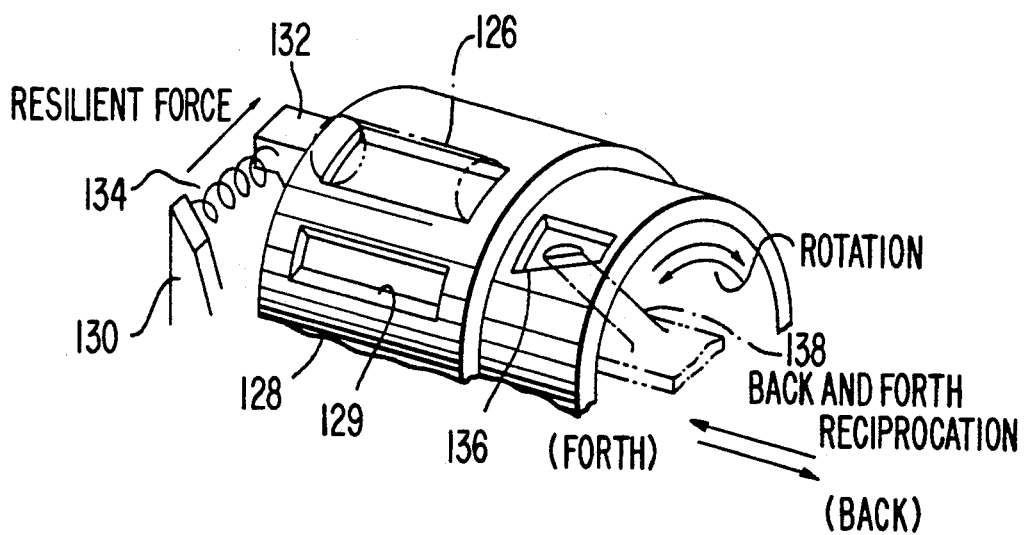
FIG. 8 is a perspective view of an interrupting device in the one-way clutch in the prior art shown in FIG. 7.
Figure 3:
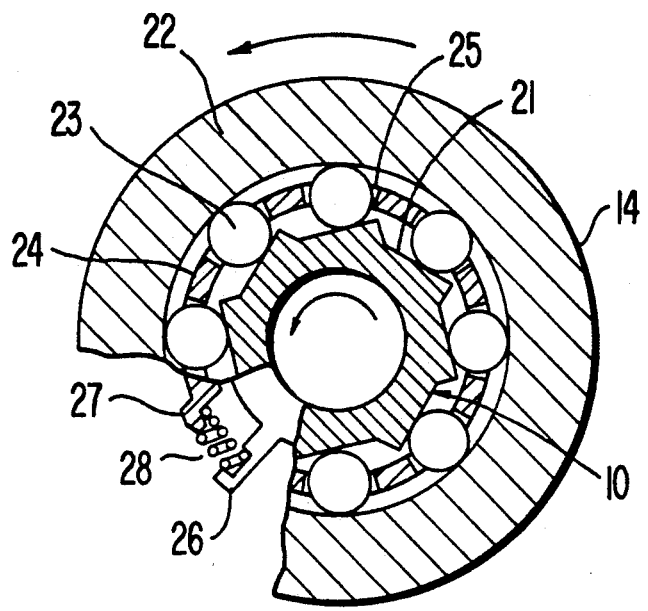
FIGS. 3(a) and 3(b) are sectional views of the same interrupting device taken along line 3—3 in FIG. 1, an ON state of the clutch being illustrated in FIG. 3(a), while an OFF state of the clutch is illustrated in FIG. 3(b)
Figure 3:
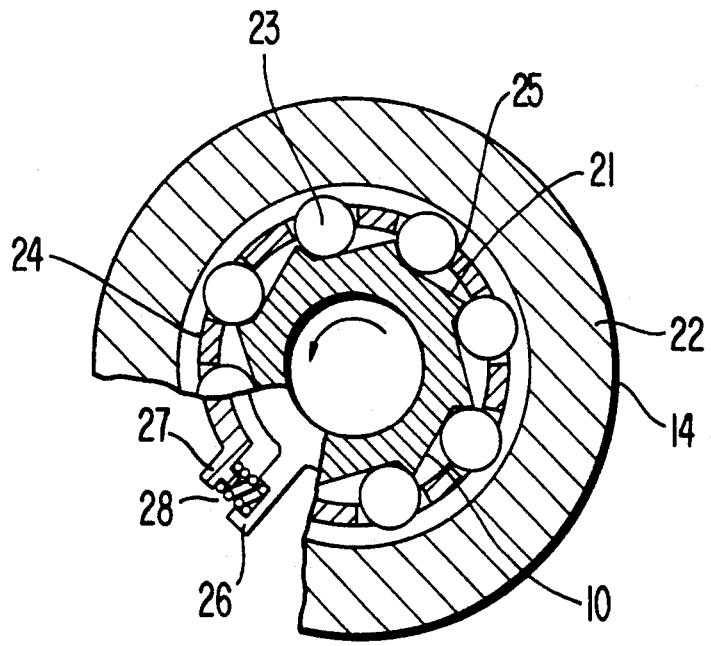
Figure 4A:
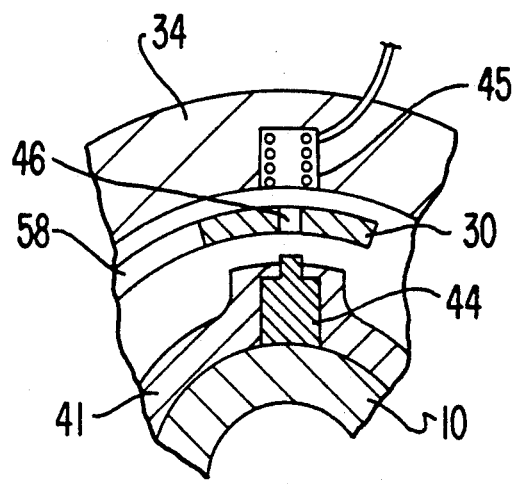
FIGS. 4(a) and 4(b) are fragmented sectional views of a rotor position sensor taken along line C—C in FIG. 1, an ON state of the clutch being shown in FIG. 3(a), while an OFF state of the clutch is shown in FIG. 3(b)

The structure of the one-way clutch 20 according to the present invention is also shown in FIGS. 2 to 4, and since its basic portion is similar to the structure in the prior art shown in FIG. 9, the basic portion will be explained briefly. That is, a cam portion 21 and a cam ring portion 22 are formed between the outer surface of the input shaft 10 and the inner surface of the output shaft 14. Between these cam portion 21 and cam ring portion 22 is provided a gap whose width varies along the circumferential direction, and in this gap are disposed a plurality of rollers 23 and a cylindrical retainer 24 extending in the circumferential direction. As best seen in FIG. 2, the respective rollers 23 are rotatably accommodated within holding holes 25 formed in the retainer 24.

A spring 28 extends between a spring bracket 26 formed on the input shaft 10 and a spring bracket 27 formed on an end portion of the retainer 24. This spring 28 biases the rollers 23 towards a narrower portion of the gap between the cam portion 21 and the cam ring portion 21 by resiliently pushing the retainer 24 in the circumferential direction.

Figure 9A:
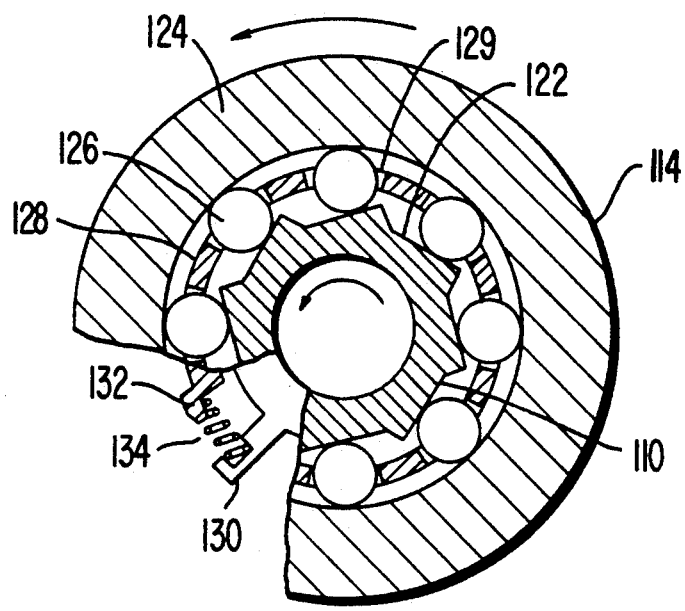
FIGS. 9(a) and 9(b) are sectional views of the same interrupting device taken along line 9—9 in FIG. 7, an ON state of the clutch being shown in FIG. 9(a), while an OFF state of the clutch is shown in FIG. 9(b).
Figure 9B:
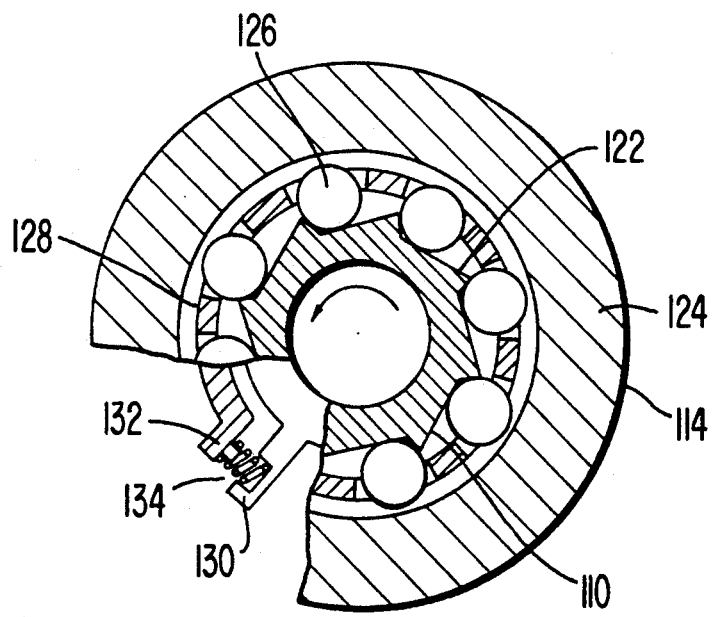

Operations relying upon such structure are as shown in FIGS. 3(a) and 3(b), and since these are similar to the operations of the structure in the prior art shown in FIGS. 9(a) and 9(b), a further explanation thereof will be omitted.

In the illustrated embodiment of the present invention, an interrupting device for a clutch is formed at one end of the retainer 24, and device will next be described this interrupting.

At one end of the above-described retainer 24 is formed an extension as shown in FIGS. 1 and 2, and this extension is used as a rotor 30. This rotor 30 consisting of an extension formed at one end of the retainer 24 has wound or formed on its outer peripheral surface a coil or a squirrel-cage short ring 32. At this outer peripheral portion surrounding the rotor 30 is equipped a stator 34. The stator 34 is has a cylindrical overall shape and has its one end portion fixedly secured to the housing 1. This stator 34 is formed by winding a rotating-field generating coil 35 around a toroidal iron core, and provision is made such that when a two-phase or multi-phase A.C. current is made to flow through this rotating-field generating coil 35 via terminals 36, a rotating magnetic field is generated in the stator 34.

This stator 34 and the above-described rotor 30 are disposed coaxially with the input shaft 10, and are opposed to each other in the radial directions as spaced from each other with a small gap retained therebetween. And, when a two-phase or multi-phase A.C. current is made to flow through the above-described rotating-field generating coil 35, a rotating magnetic field is generated in this stator 34. Due to this rotating magnetic field, an induction current is generated in the coil or squirrel-cage short ring 32, and consequently, the rotor 30 is magnetized. Accordingly, a rotary torque is applied to the rotor 30 as a result of an interaction between the rotating magnetic field on the side of the above-mentioned stator 34 and the magnetic field on the side of the rotor 30. In other words, the rotor 30 is rotated on the basis of the principle of an induction motor.

Since this rotation of the rotor 30 causes the retainer 24 to rotate against the biasing force of the spring 28, the retainer 24 is rotated to the position shown in FIG. 3(b). Hence it shifts the rollers 23 towards a wider portion of the gap between the cam portion 21 and the cam ring portion 22 consequently, the rollers 23 are released from frictional constraint between the cam portion 21 and the cam ring portion 21. Therefore, power transmission between the input shaft 10 and the output shaft 14 would be interrupted.

It is to be noted that when the current fed to the rotating-field generating coil 35 is stopped, the retainer 24 would rotate as pushed by the spring 28. Consequently, the retainer 24 urges the rollers 23 towards the narrower portion of the gap between the cam portion 21 and the cam ring portion 22. Hence, the rollers 23 are constrained between the cam portion 21 and the cam ring portion 22, and so, the rotation of the input shaft 10 would be transmitted to the output shaft 14.

In the clutch having the above-mentioned construction and function, the interrupting device for the clutch is composed of the rotor 30 and the stator 34 which are coaxially opposed to each other with a small gap retained therebetween in the radial directions. This structure is simple, employs a small number of component parts, the assembly of these parts is simple, and only a small installation space is required.

And, because such structure forms a non-contact type interrupting device, vibrations and impacts would not be directly transmitted between and friction would not arise between the members of the interrupting device. Thus, the device will have a long life.

In addition, because the above-described interrupting device is constructed outside of the input shaft 10, the interrupting device is not restricted by the size of the input shaft 10.

Furthermore, special parts are unnecessary at the opposite axial end portions of the housing 1, and so, the opposite axial end portions of the housing 1 may be effectively used.

Now, in a friction type one-way clutch having the above-described structure, the force between the roller 23 and the cam portion 21, that is, the frictional engaging force varies depending upon a rotational speed of the input shaft 10. That is, in the case where the rotational speed of the input shaft 10 is large, the frictional force is correspondingly large. Consequently, the force for disengaging the clutch would require a large torque. If the electric power fed to the rotating-field generating coil 35 of the stator 34 were set at such a high level that the maximum torque was always obtained, then power consumption is high and significant heat could be generated by induction currents. Therefore, it is desirable for the power fed to the rotating-field generating coil 35 to be controlled depending upon the rotational speed of the input shaft 10.

In order to realize the above-mentioned control, in the illustrated embodiment of the present invention, the following structure is employed That is, as shown in FIG. 1, a rotational speed sensor 40 is equipped in the housing 1, and this rotational speed sensor 40 is adapted to detect a rotational speed of the input shaft 10. A rotational speed signal of the input shaft 10 detected by this rotational speed sensor 40 is sent to a control unit 50 shown in FIG. 5.

It is to be noted that in order to prevent heat generation in the clutch 20, an oil hole 38 for feeding coolant oil or lubricant oil is formed in the input shaft 10, so that the clutch 20 may be cooled by feeding coolant oil or lubricant oil from this oil hole 38 through the inside of the input shaft 10 to the clutch 20.

In addition, the input shaft 10 is equipped with a magnet 44 for monitoring an ON-OFF state of the clutch, via a holder 41. A position sensor 45 for generating an electric signal by a magnetic force of the above-mentioned magnet 44 is equipped in opposition to the magnet 44, for instance, on the stator 34. And, a wall of the above-mentioned rotor 30 is disposed at a position between magnet 44 and position sensor 45, and in this wall is formed a position-detecting hole 46.

The positional relationship among magnet 44, position sensor 45 and position detecting hole 46 is shown in FIG. 4, and provision is made such that in the case where the clutch is engaged, the magnet 44, position detecting hole 46 and position sensor 45 align as shown in FIG. 4(), and a magnetic field of the magnet 44 acts upon the position sensor 45. Consequently, the position sensor 45 issues a predetermined electric signal.

Figure 4B:
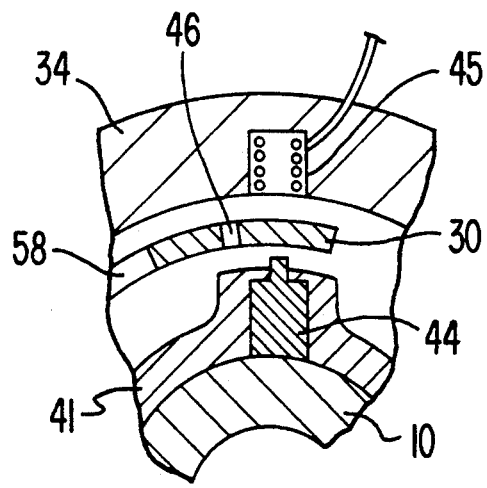

In the case where the clutch is disengaged since the rotor 30 has been rotated the position detecting hole 46 is displaced and the wall of the rotor 30 intervenes between the magnet 44 and the position sensor 45 as shown in FIG. 4(b). Consequently, a magnetic field of the magnet 44 is intercepted, and the position sensor 45 would not issue an electric signal.

The above-described position sensor 45 is connected to a control unit 50 shown in FIG. 5. Now describings the control unit 50, reference numeral 51 designates an arithmetic and control unit, which receives the signal transmitted from the above-mentioned rotational speed sensor 40 and the signal transmitted from the position sensor 45. It is to be noted that this arithmetic and control unit 51 is operable either in a digital mode or in an analog mode, or in a combined digital and analog mode.

Reference numeral 52 designates a retainer rotary torque indicator, in which a torque necessary for rotating the retainer 24 with respect to the input shaft 10 is set, depending upon a difference between a rotational speed of the input shaft and a rotational speed of the magnetic field. This set value is transmitted to the arithmetic and control unit 51. It is to be noted that once the torque indicator 52 has been set, there is no need to set the again.

The above-mentioned arithmetic and control unit 51 calculates an electric power for applying an optimum torque to the retainer 24 in response to the signals transmitted from the above-described rotational speed sensor 40, position sensor 45 and retainer rotary torque indicator 52, then calculates an optimum frequency and an optimum voltage on the basis of the result of the first calculation, and then applies a command to an inverter 53.

The inverter 53 generates a necessary A.C. voltage in response to the command transmitted from the above-mentioned arithmetic and control unit 51. This A.C. voltage is amplified by a power amplifier 54, and an amplified A.C. current is fed to the rotating-field generating coil 35. Reference numeral 55 designates a power supply, which feeds necessary electric power to the control unit 50. Reference numeral 56 designates an operation switch provided on an operation panel in a cockpit, and it issues an instruction for switching on or off the clutch. Reference numeral 57 designates a clutch ON-OFF indicator, which detects the position of a slit 58 formed in the wall of the rotor 30 shown in FIG. 4 and indicates an "OFF" state in the case where the clutch is disengaged.

Now the operation of the clutch disconnecting torque setting device will be described.

In the Case of Disengaging the Clutch Under a Stationary State and Causing Only an Input Shaft to Rotate An instruction of clutch "OFF" is given to the control unit 50 by means of the operation switch 56 in the cockpit shown in FIG. 5. In response to the rotational speed signal (in this case, not rotating) transmitted from the rotational speed sensor 40, and the signals transmitted from the position sensor 45 and from the retainer rotary torque indicator 52, the arithmetic and control unit 51 calculates an optimum frequency and an optimum voltage, and feeds an A.C. current to the rotating-field generating coil 35 of the stator 34 by the intermediary of the inverter 53 and the power amplifier 54.

As a result of this feeding of an A.C. current, a rotating magnetic field is generated in the stator 34, and as described previously, this rotating magnetic field applies a rotary torque to the rotor 30 and causes this rotor 30 to rotate. Since the retainer 24 is thereby rotated, the rollers 23 are shifted in the circumferential direction as the position shown in FIG. 3(b), and the rollers 23 are released from frictional constraint to bring about the state where power transmission between the input shaft 10 and the output shaft 14 is interrupted.

Even if the input shaft 10 is rotated under this condition, in response to the rotational speed signal transmitted from the rotational speed sensor 40, the retainer position detection signal issued by the position sensor 45 and the signal issued from the retainer rotary torque indicator 52, the arithmetic and control unit 51 always calculates an optimum frequency and an optimum voltage, and feeds an A.C. current to the rotating-field generating coil 35 of the stator 34 to separate the retainer 24. Accordingly, the clutch "OFF" state is maintained. In this case, the clutch ON-OFF indicator 57 indicates a of clutch "OFF".

In the Case of Switching the Clutch "ON" Under a Stationary State and Causing an Input Shaft to Rotate If a command of clutch "ON" is given to the control unit 50 by the operation switch 56 in the cockpit shown in FIG. 5, then in this case, the arithmetic and control unit 51 does not feed electric power to the inverter 53 regardless of the rotational speed signal sent from the rotational speed sensor 40 and the signals transmitted from the position sensor 45 and the retainer rotary torque indicator 52, and hence an electric current is not fed to the rotating-field generating coil 35 of the stator 34.

Therefore, the rotor 30 would move to the position shown in FIG. 3(a) under the action of the biasing force of the spring 28, and so, the rollers 23 are nipped between the cam portion 21 and the cam ring portion 22 and connect the input shaft 10 with the output shaft 14. If the input shaft 10 is rotated under this condition, the output shaft 14 is integrally rotated. It is to be noted that in this case, is the clutch ON-OFF indicator 57 indicates a clutch "ON" state.

In the Case of Switching the Clutch "OFF" Under an "ON" State of the Clutch

In the case where both the input shaft 10 and the output shaft 14 are rotating under an "ON" state of the clutch, if the operation switch 56 in the cockpit shown in FIG. 5 is turned to clutch "OFF", then in response to the rotational speed signal sent from the rotational speed sensor 40, the retainer position information obtained by the position sensor 45 and the signal transmitted from the retainer rotary torque indicator 52, the arithmetic and control unit 51 calculates an optimum frequency and an optimum voltage, and feeds an A.C. current to the rotating-field generating coil 35 of the stator 34 by the intermediary of the inverter 53 and the power amplifier 54.

As a result of this feeding of an A.C. current, a rotating magnetic field is generated in the stator 34. Hence, a rotary torque is applied to the rotor 30 and the retainer 24 is rotated. Therefore, the rollers 23 are moved to the position shown in FIG. 3(b). Thus the rollers 23 are released from frictional constraint, and whereby power transmission between the input shaft 10 and the output shaft 14 is interrupted. Hence, rotation of the output shaft 14 is stopped.

Even if the rotational speed of the input shaft 10 should increase under the above-mentioned state, in response to the rotational speed signal sent from the rotational speed sensor 40, the retainer position detection signal generated by the position sensor 45 and the signal transmitted from the retainer rotary torque indicator 52, the arithmetic and control unit 51 always calculates an optimum frequency and an optimum voltage, and feeds an A.C. current to the rotating-field generating coil 35 of the stator 34 to separate the retainer 24. Accordingly, the clutch "OFF" state can be maintained. It is to be noted that in this case, the clutch ON-OFF indicator indicates a clutch "OFF" state.

According to the above-described construction, since the force for disengaging the clutch can be controlled to be optimum depending upon the rotational sped of the input shaft 10, electric power can be saved, and also, heat generation due to an induction current can be suppressed to a minimum.

Figure 6:
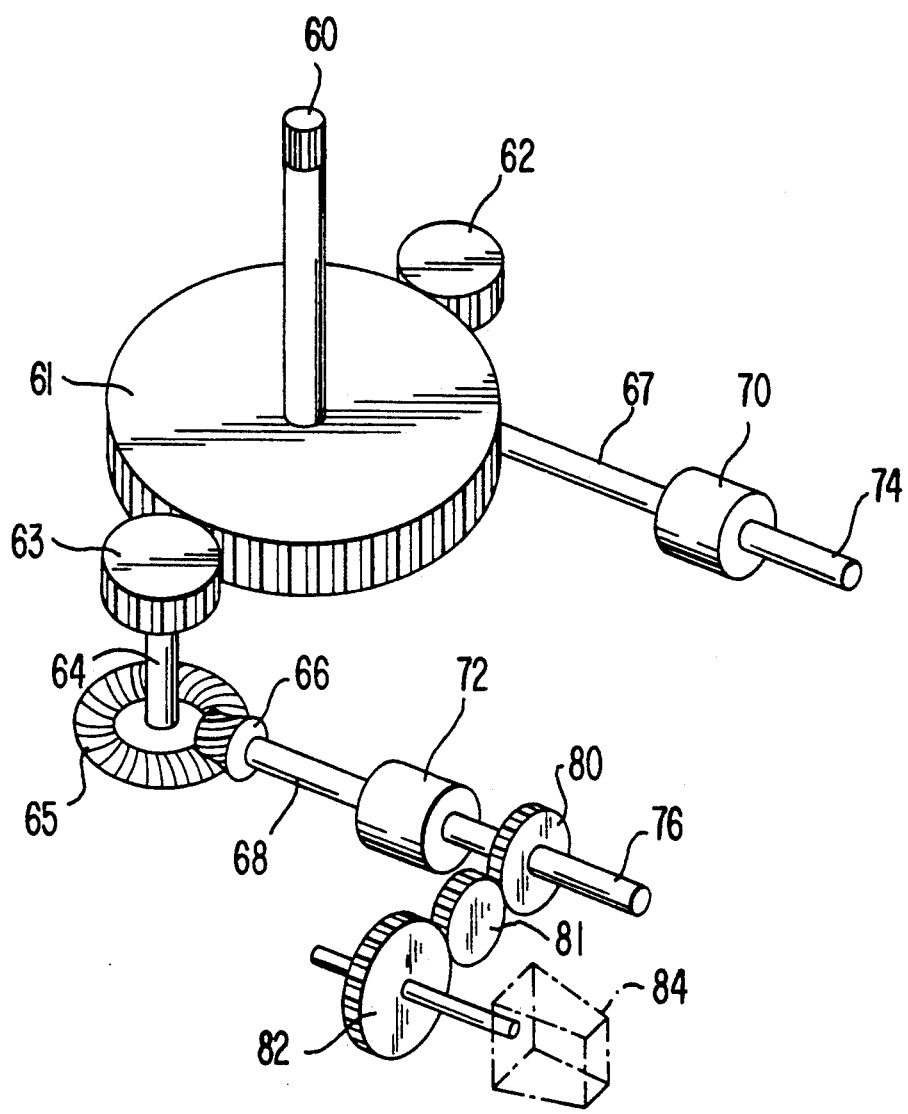
FIG. 6 is a perspective view of a transmission system in a helicopter incorporating a clutch according to the same preferred embodiment of the present invention.
Figure 7:
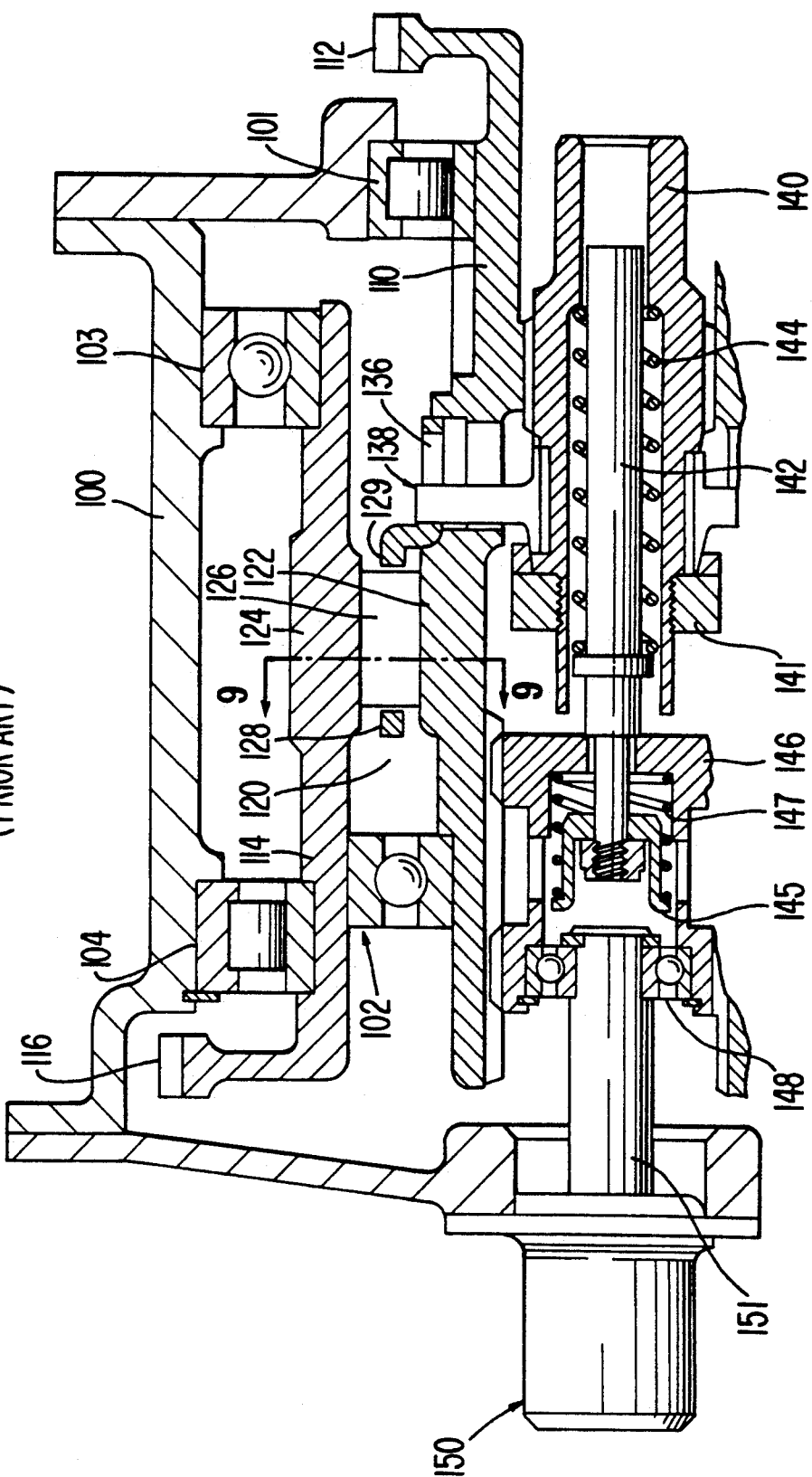
FIG. 7 is a cross-sectional view of a friction type one-way clutch in the prior art.

Next, the application of the clutch according to the above-described embodiment of the present invention will be described as applied to a transmission of a helicopter FIG. 6 shows a transmission system of a twin-engine drive of a helicopter. In this figure, reference numeral 60 designates a main shaft. The top end portion of this main shaft 60 is adapted to be connected to main rotor blades (not shown), and to the bottom of the same main shaft 60 is mounted a main gear 61. A right side gear 62 and a left side gear 63 are respectively meshed with this main gear 61. Each right side gear 62 and left side gear 63 connected to a respective one of a right side transmission shaft 67 and a left side transmission shaft 68 via a vertical shaft 64 and bevel gears 65 and 66. Right side transmission shaft 67 and left side transmission shaft 68 are respectively connected to a right side drive shaft. 74 and a left side drive shaft 76 via a right side clutch 70 and a left side clutch 72, respectively. Right side drive shaft 74 and left side drive shaft 76 are respectively connected to a right side engine and a left side engine (not shown). To the left side drive shaft 76 is connected an accessory 84 via accessory drive gears 80, 81 and 82. The right side clutch 70 and left side clutch 72 employ the present invention shown in FIGS. 1 to 5.

In the case of the above-mentioned construction, rotations of the drive shafts 74 and 76, which are driven by the right side and left side engines, are transmitted respectively to the transmission shafts 67 and 68 via the clutches 70 and 72, and then they are transmitted to the main gear 61 via the vertical shafts 64, 64 and the gears 62 and 63. Accordingly, the main shaft 60 rotates to rotate main rotor blades (not shown).

Here, if the clutches 70 and 72 are switched to an "OFF" state, rotational drive for the rotor blades is stopped. And if the right side engine is stopped and only the left side engine is driven, that is, if single-engine operation is effected, although the left side transmission shaft 68 and the subsequent drive system are stopped, since the left side drive shaft 76 is rotating, the accessory 84 is operated via the accessory drive gears 80, 81 and 82. From the above-mentioned reasons, a test operation of the accessory system by single-engine operation on the ground becomes possible.

The clutches according to the present invention do not include an actuator at an axial end portion of the housing. Hence, the transmission shaft and the drive shaft can be connected coaxially in the axial direction of the clutch 70 or 72, and accordingly, the layout shown in FIG. 6 can be reasonably realized.

Although the friction elements were described as rollers 23 above, the present invention can be practiced by employing needle bearings as the friction elements.

Also, the clutch according to the present invention is not limited in its application to a transmission system in a helicopter, but can be employed as a friction type one-way clutch in various fields.

As will be obvious from the detailed description of one preferred embodiment of the present invention above, because the interrupting mechanism of a clutch is composed of a rotor and a stator, the structure is simple, the number of component parts is small, the assembly of the clutch is simple, and the installation spaced required is also small. Moreover, since this structure is a non-contact type, vibrations and impacts are not transmitted between the members of the device, and friction will not be produced between the respective members, whereby the device has a long life. In addition, owing to the fact that the above-mentioned interrupting mechanism is located outside of the input side member, the size of the mechanism is not adversely restricted by the size of the input side member. Moreover, because a special component part, such as an actuator or the like, is not disposed at the axial end portion of the housing, the end portion of the housing can be utilized.

While a principle of the present invention has been described above in connection with one preferred embodiment of the invention, it is intended that all matter contained in the above description and illustrated in the accompanying drawings be interpreted as illustrative and not in a limiting sense.

What is claimed is:

1. A friction type one-way clutch comprising: an input side member and an output side member disposed coaxially, said members having respective cam surfaces defining a gap therebetween of a width taken between said surfaces that varies in the circumferential direction of said members, friction elements disposed in said gap defined between said cam surfaces, a retainer interposed between said input side member and said output side member and retaining said friction elements in said gap, said retainer being rotatable to a first position which positions said friction elements in frictional engagement with said cam surfaces such that rotation of said input side member is transmitted to said output side member by said friction elements and to a second position at which said friction elements are out of frictional engagement with said cam surfaces so that power transmission from said input side member to said output side member is interrupted, a rotor forming an integral part of said retainer, a stator disposed around the circumference of said rotor, said stator including a core and coils would about the core which will generate a rotational magnetic field when electric current is fed thereto, whereby said rotor is rotated by the rotational magnetic field so as to rotate the retainer.

2. A friction type one-way clutch as claimed in claim 1, and further comprising a rotational speed sensor means for detecting a rotational speed of said input side member, and a controller means for controlling electric power fed to said coils in accordance with said rotational speed, said retainer being rotated by controlling an intensity of the rotational magnetic field in accordance with the rotational speed of the input side member.

3. A friction type one-way clutch as claimed in claim 2, and further comprising a position sensor means for detecting a position of the retainer, said controller means being operatively connected to said position sensor means so as to receive a signal therefrom and control the electric power fed to the coils also on the basis of said signal.

* * * * *